United States Patent
Ballard et al.

(10) Patent No.: US 7,930,749 B2
(45) Date of Patent: Apr. 19, 2011

(54) ACCELERATED DATA SCANNING

(75) Inventors: Clinton L Ballard, Suquamish, WA (US); Joshua Nathaniel Lizon, Bremerton, WA (US)

(73) Assignee: Eacceleration Corp., Poulsbo, WA (US)

( * ) Notice: Subject to any disclaimer, the term of this patent is extended or adjusted under 35 U.S.C. 154(b) by 1378 days.

(21) Appl. No.: 11/432,651

(22) Filed: May 11, 2006

(65) Prior Publication Data

US 2007/0266436 A1 Nov. 15, 2007

(51) Int. Cl.
G06F 21/00 (2006.01)
G06F 11/30 (2006.01)
G08B 23/00 (2006.01)

(52) U.S. Cl. .......................................... 726/24
(58) Field of Classification Search .................. None
See application file for complete search history.

(56) References Cited

U.S. PATENT DOCUMENTS

| | | | |
|---|---|---|---|
| 6,021,510 A * | 2/2000 | Nachenberg | 714/38 |
| 6,542,943 B2 | 4/2003 | Cheng et al. | |
| 6,748,534 B1 | 6/2004 | Gryaznov et al. | |
| 6,886,099 B1 | 4/2005 | Smithson et al. | |
| 6,928,555 B1 * | 8/2005 | Drew | 726/24 |
| 6,952,776 B1 | 10/2005 | Chess | |
| 6,963,978 B1 | 11/2005 | Muttik et al. | |
| 6,973,578 B1 | 12/2005 | McIchionc | |
| 6,980,992 B1 | 12/2005 | Hursey et al. | |
| 6,993,660 B1 | 1/2006 | Libenzi et al. | |
| 7,020,895 B2 | 3/2006 | Albrecht | |
| 7,036,147 B1 * | 4/2006 | Hursey | 726/24 |
| 7,581,252 B2 * | 8/2009 | Challener et al. | 726/24 |
| 7,581,253 B2 * | 8/2009 | Challener et al. | 726/24 |
| 7,836,505 B2 * | 11/2010 | Ballard | 726/24 |
| 7,861,296 B2 * | 12/2010 | Costea et al. | 726/22 |
| 2005/0229254 A1 * | 10/2005 | Singh et al. | 726/23 |
| 2007/0061884 A1 * | 3/2007 | Dapp et al. | 726/23 |
| 2007/0067842 A1 * | 3/2007 | Greene et al. | 726/24 |
| 2007/0283440 A1 * | 12/2007 | Yao et al. | 726/24 |
| 2009/0044273 A1 * | 2/2009 | Zhou et al. | 726/24 |
| 2010/0077482 A1 * | 3/2010 | Adams | 726/24 |

* cited by examiner

*Primary Examiner* — Christopher A Revak
(74) *Attorney, Agent, or Firm* — Steven P. Koda

(57) ABSTRACT

Files stored on a hard disk drive are scanned for a predefined pattern, such as a virus definition. For each one of a plurality of files, predetermined select portion(s) (e.g., likely sites of infection) are stored in a common file. After storing the predetermined select portions, the portions are tested without accessing the file to determine whether content of the predetermined select portion corresponds to the predefined pattern.

32 Claims, 7 Drawing Sheets

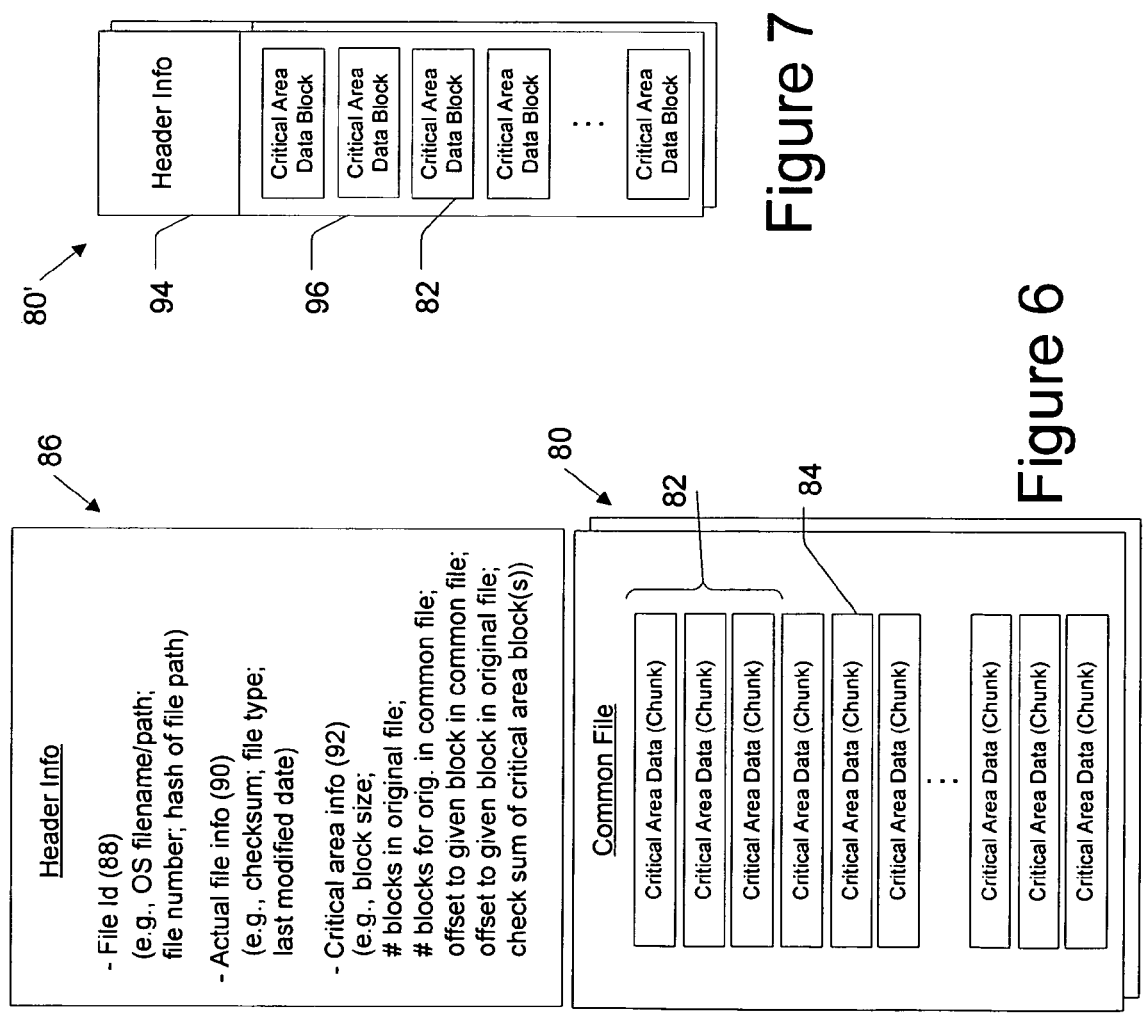

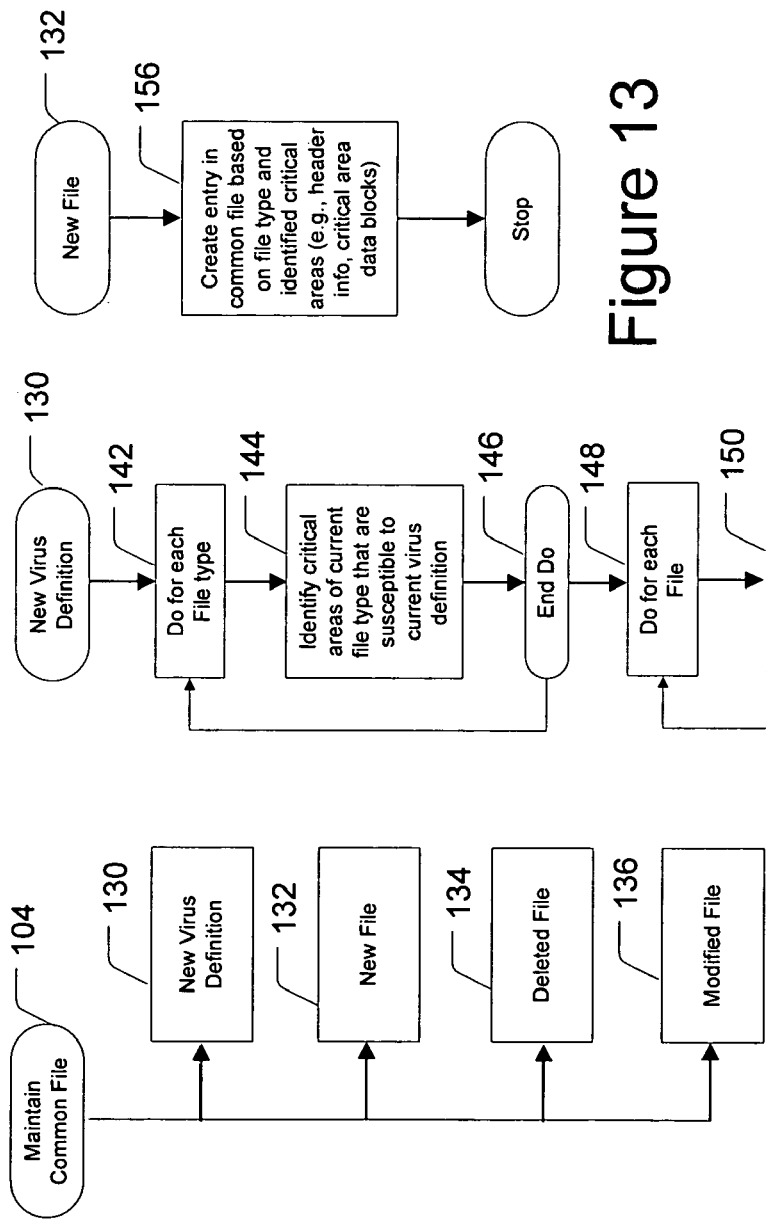
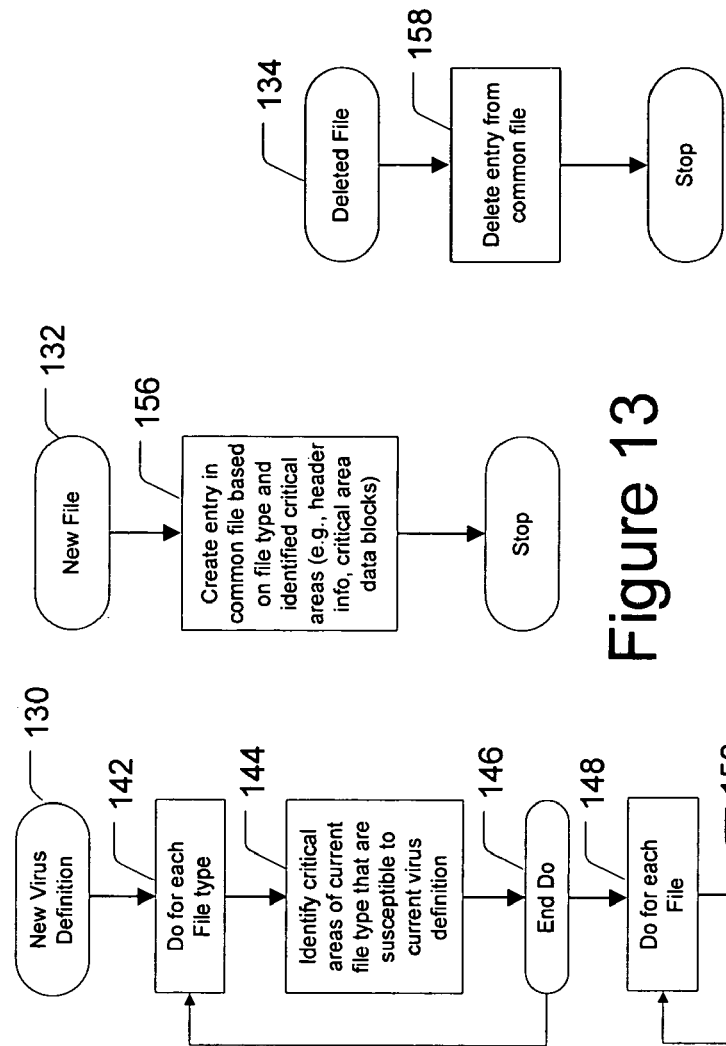
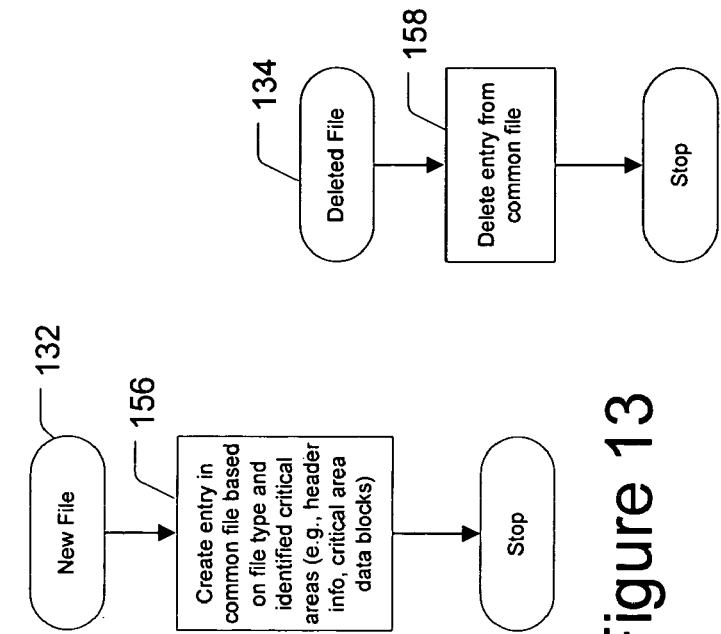
Figure 14
Figure 13
Figure 12
Figure 11

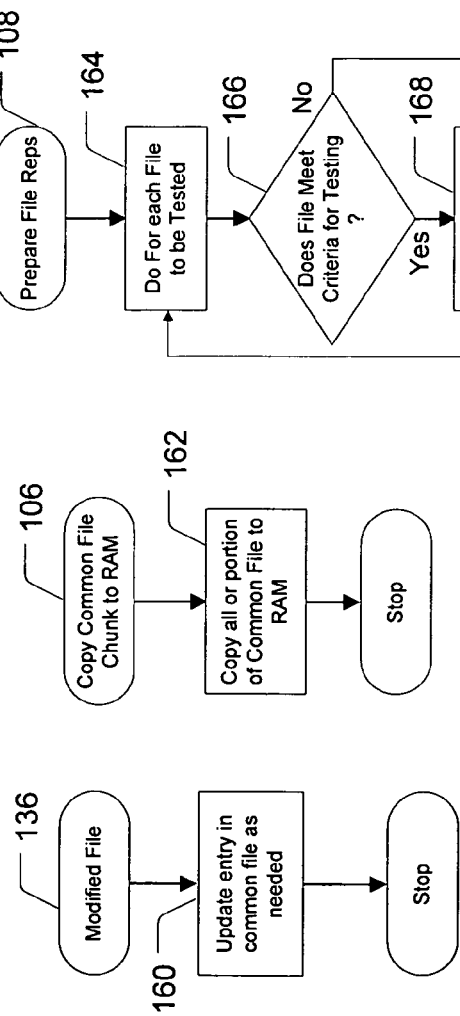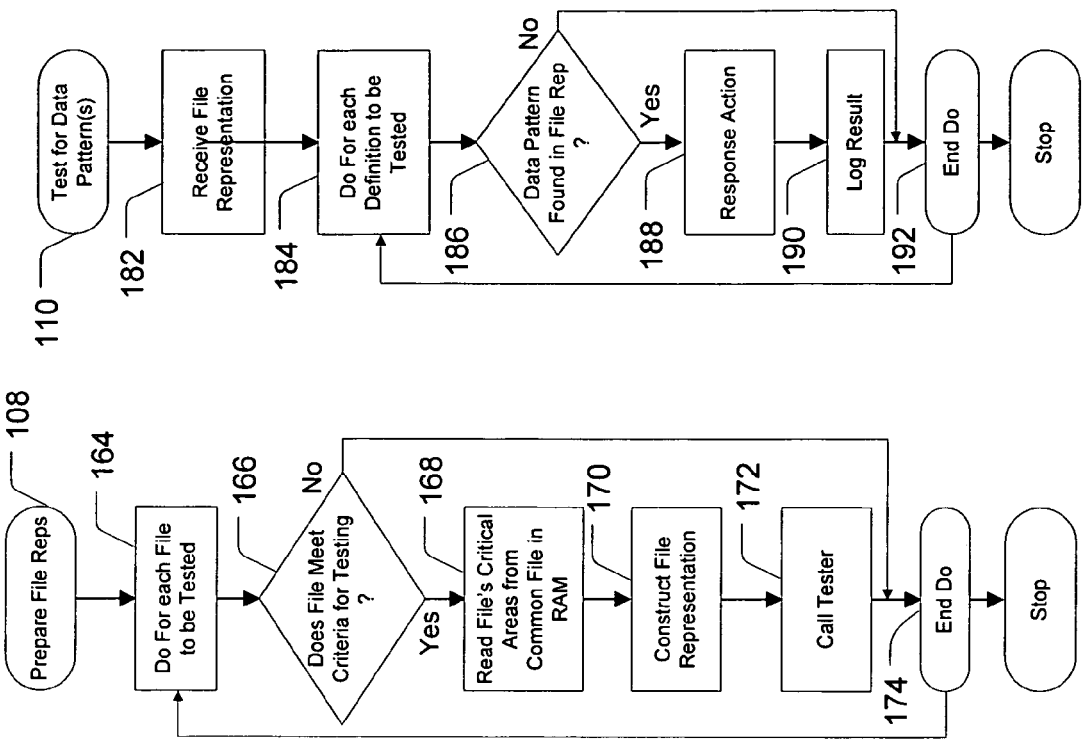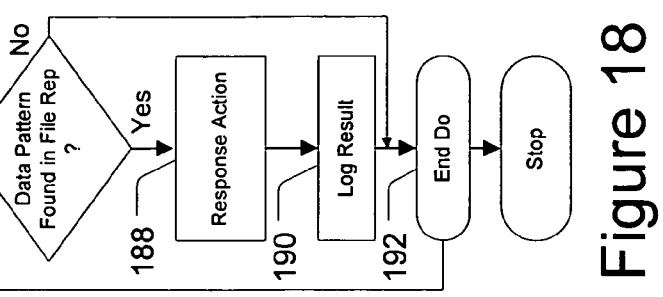
Figure 15
Figure 16
Figure 17
Figure 18

ACCELERATED DATA SCANNING

FIELD OF THE INVENTION

This invention relates generally to the fields of file searching and data scanning, and more particularly to the field of scanning digital objects for data patterns.

BACKGROUND OF THE INVENTION

File searching and data scanning are performed in many contexts. As internet communications proliferate and the need for digital security increases, an expanding context is malware cleaning software applications. The term 'malware' encompasses computer viruses and other 'infections', along with spyware, adware and other software having a malicious effect on the computer. Typical cleaning applications check digital objects on a computer against definition files, (e.g., virus definitions). Various objects that may become 'infected' or subjected to malicious software include, but are not limited to: files, directories, registry entries, Layered Service Providers (LSP's), file contents, services, running processes and modules, browser helper objects, and browser cookies.

Common processes performed in cleaning malware from a computer include: reading files from a hard disk drive; and comparing the files read against a plurality of malware definitions. To scan an entire hard disk may take an excessive amount of time. For example, a conventional 100 gigabyte hard drive having a media transfer rate of 20 megabytes per second, requires more than 1 hour just to stream the data from the disk. With added time for disks seeks and malware testing, substantially more time is required. In particular, testing all files and other digital objects for all malware definitions using a conventional scan engine takes an excessive length of time.

Accordingly, there is a need for accelerating the scanning of digital objects on a computer to test for malware definitions, and other data patterns.

SUMMARY OF THE INVENTION

The present invention provides a method of testing files and other digital objects stored on a hard disk drive for one or more predefined patterns. For each one of a plurality of digital objects, one or more predetermined select portions of the object are stored in a common file. The selected portions for one or more of the plurality of objects are tested thereafter by accessing the common file, rather than the original file. The selected portions are tested to determine whether content of the select portions corresponds to one or more of the predefined patterns.

The invention will be better understood by reference to the following detailed description taken in conjunction with the accompanying drawings.

BRIEF DESCRIPTION OF THE DRAWINGS

The invention is further described in the detailed description that follows, by reference to the noted drawings by way of non-limiting illustrative embodiments of the invention, in which like reference numerals represent similar parts throughout the drawings. As should be understood, however, the invention is not limited to the precise arrangements and instrumentalities shown. In the drawings:

FIG. 6 is a diagram of an embodiment of a common file for storing critical data areas for a plurality of files;

FIG. 7 is a diagram of another embodiment of a common file for storing critical data areas for a plurality of files;

FIG. 8 is a diagram of another embodiment of a common file for storing critical data areas for a plurality of files;

FIG. 11 is a functional diagram of processes which maintain a common file for an embodiment of the accelerated data scanner;

FIG. 12 is a flow chart of a process to maintain the common file when a new virus definition is introduced for an embodiment of the accelerated data scanner;

FIG. 13 is a flow chart of a process to maintain the common file when a new file is created for an embodiment of the accelerated data scanner;

FIG. 14 is a flow chart of a process to maintain the common file when a file is deleted for an embodiment of the accelerated data scanner;

FIG. 15 is a flow chart of a process to maintain the common file when a file is modified for an embodiment of the accelerated data scanner;

FIG. 16 is a flow chart of a process to copy the common file into RAM for an embodiment of the accelerated data scanner;

FIG. 17 is a flow chart of a process to prepare a file representation for an embodiment of the accelerated data scanner; and FIG. 18 is a flow chart of a process to test a file representation for an embodiment of the accelerated data scanner.

DETAILED DESCRIPTION OF ILLUSTRATIVE EMBODIMENTS

In the following description, for purposes of explanation and not limitation, specific details may be set forth, such as particular networks, communication systems, computers, terminals, devices, components, techniques, data and network protocols, software products and systems, enterprise applications, operating systems, development interfaces, hardware, etc. in order to provide a thorough understanding of the present invention. However, it will be apparent to one skilled in the art that the present invention may be practiced in other embodiments that depart from these specific details. Detailed descriptions of well-known networks, communication systems, computers, terminals, devices, components, techniques, data and network protocols, software products and systems, operating systems, development interfaces, and hardware are omitted so as not to obscure the description of the present invention.

Further, embodiments of methods of the invention are described below in part with regard to flow charts. Such embodiments are to be performed by a computer executing one or more computer programs made up of data and computer-executable instructions. The flow charts enable one skilled in the art to develop computer program embodiments on variously configured computers. For example, for computer programs written in accordance with recognized standards, the computer program may be executed on a variety of hardware platforms and interface to a variety of computer operating systems. It will be appreciated that a variety of programming languages may be used to implement the method embodiments described herein. Also, when referring to software, (e.g., a program, process; procedure; module; application) as taking an action or causing a result, it is meant that one or more processors of a computer are executing program instructions on data to enable the computer to achieve such action or result.

Operating Environment

Figure 1:
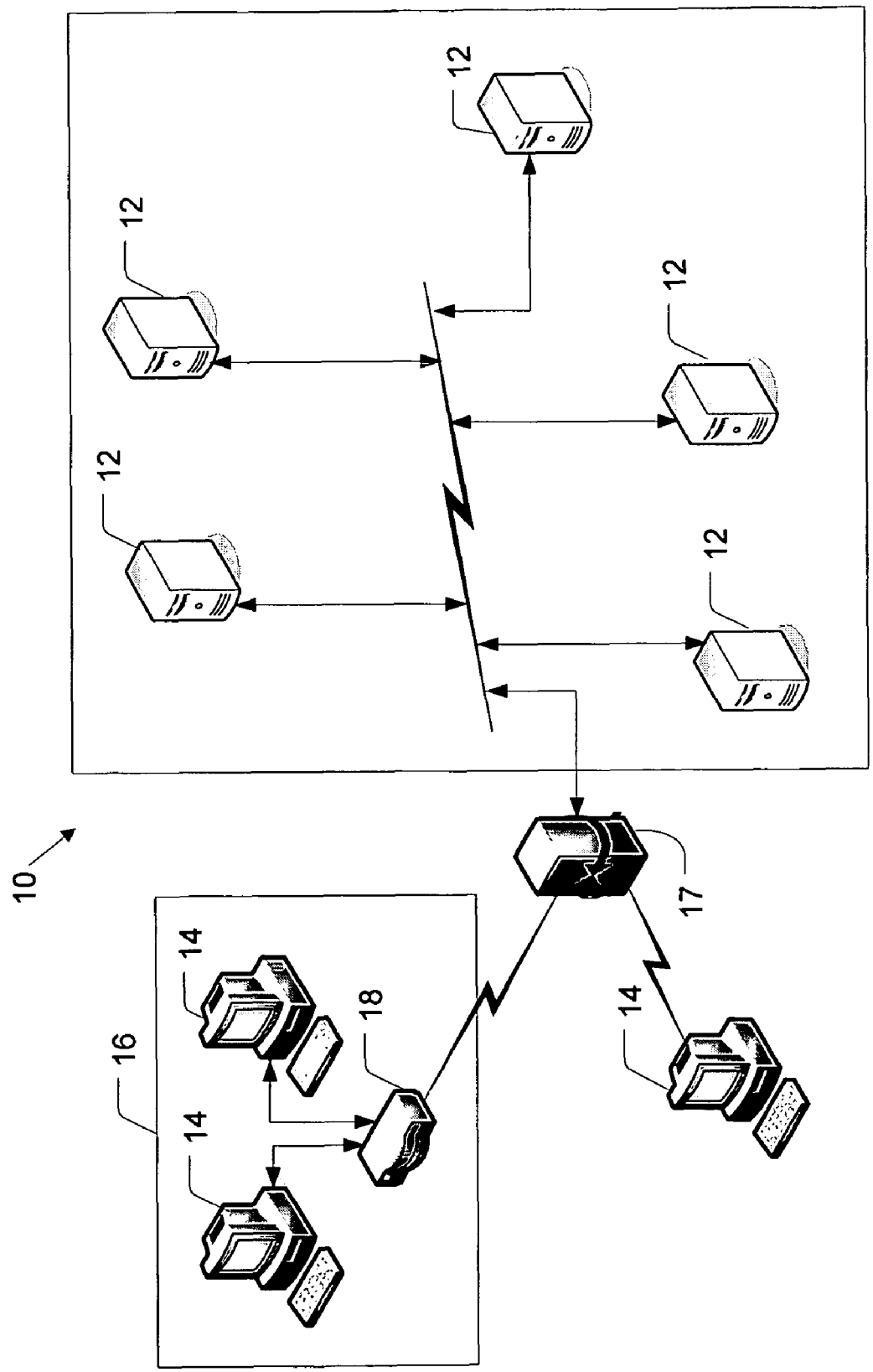
FIG. 1 is a block diagram of a wide area network environment which may host an embodiment of the present invention.
Figure 2:
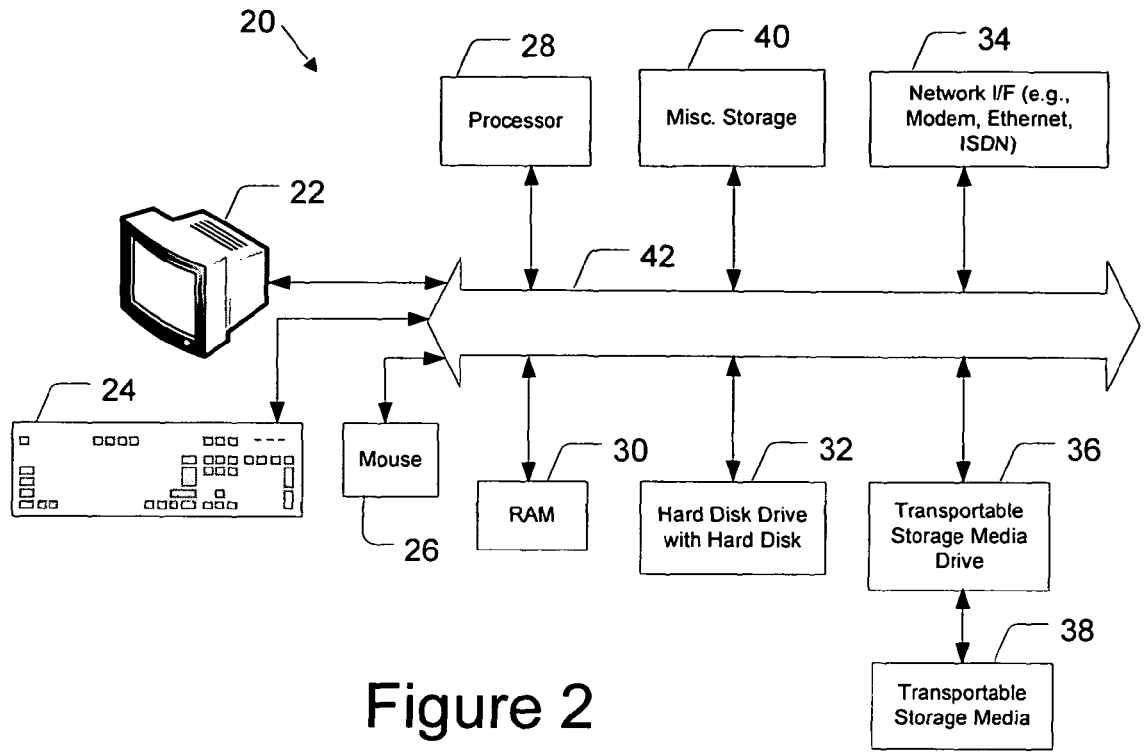
FIG. 2 is a block diagram of an exemplary computer system that may embody a user computer or server computer for hosting one or more processes described in the detailed description.
Figure 3:
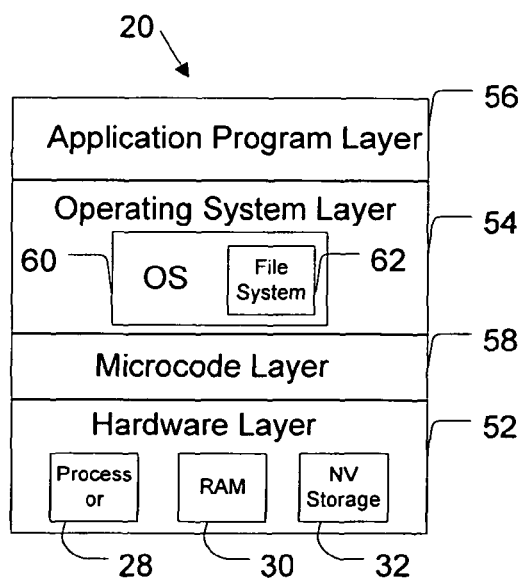
FIG. 3 is a block diagram of an exemplary computing platform for hosting one or more processes described in the detailed description.

FIGS. 1-3 are intended to provide an overview of an operating environment hosting various embodiments of the inventions. FIG. 1 depicts an exemplary network operating environment. FIGS. 2 and 3 depict an exemplary computer operating environment. These examples are not intended to limit the applicable operating environments. On of skill in the art will appreciate that embodiments of the inventions may be practiced on other network and computer configurations, including hand-held devices, multiprocessor systems, microprocessor based electronics, programmable consumer electronics, network computers, minicomputers, mainframe computers, and the like. Embodiments of the inventions also may be practiced in distributed processing environments, such as where tasks are performed by remote processors linked through a communication network.

FIG. 1 shows a wide area network 10 formed by a plurality of network server computers 12 which are interlinked. Each network server computer 12 stores documents accessible to other network server computers 12 and to client computers 14 and networks 16 which link into the wide area network 10. The configuration of the wide area network 10 may change overtime as client computers 14 and one or more networks 16 connect and disconnect from the network 10. For example, when a client computer 14 and a network 16 are connected with the network server computers 12, the wide area network includes such client computer 14 and network 16. As used herein the term computer includes any device or machine capable of accepting data, applying prescribed processes to the data, and supplying results of the processes.

The wide area network 10 stores information which is accessible to the network server computers 12, remote networks 16 and client computers 14. The information is accessible as documents. The term document as used herein, includes files (as per the Windows operating system usage and Linux operating system usage), documents (as per the MacOS operating system usage), pages (as per the web phraseology usage), and other records, entries or terminology used to describe a unit of a data base, a unit of a file system or a unit of another data collection type, whether or not such units are related or relational.

The network server computers 12 are formed by main frame computers minicomputers, and/or microcomputers having one or more processors each. The server computers 12 are linked together by wired and/or wireless transfer media, such as conductive wire, fiber optic cable, and/or microwave transmission media, satellite transmission media or other conductive, optic or electromagnetic wave transmission media. The client computers 14 access a network server computer 12 by a similar wired or a wireless transfer medium. For example, a client computer 14 may link into the wide area network 10 using a modem and establish a link to a gateway 18 (e.g., an a point of presence or aggregation point) for an IP or other wide area network. Alternative carrier systems such as cable and satellite communication systems also may be used to link into the wide area network 10. Still other private or time-shared carrier systems may be used. In one embodiment the wide area network is a global information network, such as the internet. In another embodiment the wide area network is a private intranet using similar protocols as the internet, but with added security measures and restricted access controls. In still other embodiments the wide area network is a private or semi-private network using proprietary communication protocols.

The client computer 14 may be an end user computer, and may also be a mainframe computer, minicomputer or microcomputer having one or more microprocessors. Further, the client computer 14 may be a cell phone, smart phone, personal digital assistant or other computing device. The remote network 16 may be a local area network, a network added into the wide area network through an independent service provider (ISP) for the internet, or another group of computers interconnected by wired or wireless transfer media having a configuration which is either fixed or changing over time. Client computers 14 may link into and access the wide area network 10 independently or through a remote network 16. For example, computers 14 may be coupled to a router 17 which accesses the wide area network through a gateway 18.

FIG. 2 shows a computer system 20 including a processor 28, random access memory (RAM) 30, and a non-volatile storage device such as a hard disk drive 32. In addition, a computer system may include a display monitor 22, a keyboard 24, a pointing/clicking device 26, and a communication or network interface 34 (e.g., modem; ethernet adapter). In addition other devices may be included, such as a transportable storage media drive 36 which reads transportable storage media 38, or other miscellaneous storage devices 40, such as a floppy disk drive, CD-ROM drive, zip drive, bemoulli drive or other magnetic, optical or other storage media. The various components interface and exchange data and commands through one or more busses 42. The computer system 20 receives information by entry through the keyboard 24, pointing/clicking device 26, the network interface 34 or another input device or input port. The computer system 20 may be any of the types well known in the art, such as a mainframe computer, minicomputer, or microcomputer. The computer system 20 may even be configured as a workstation, personal computer, network server, or a reduced-feature network terminal device. Further the computer 20 may be embodied as a cell phone, smart phone or personal digital assistant (PDA).

Referring to FIG. 3, the computer 20 includes a computing platform 50 having a hardware layer 52, an operating system layer 54 and an application program layer 56. A microinstruction code layer 58 also may be included for interfacing between the hardware layer 52 and the operating system layer 54. The operating system layer includes an operating system 60 which coordinates operation of the various hardware devices (e.g., see hardware devices of FIG. 2) that form the hardware layer 52. The operating system 60 also provides an operating environment for application programs and utilities running on the application layer 56. The operating environment includes various digital objects, such as files. A file system 62 is maintained as part of the operating system for controlling access to files stored on a non-volatile storage device 32. The file system includes a data structure which stores information about each file, such as file type, file identifier, file length, creation date, modification date, and other information.

OVERVIEW

The present invention is directed toward file scan engines and data search engines which may be part of the operating system layer 54 or be an application or utility executing as part of the application layer 56. The search engines read and test data structures, such as files and other digital objects, for specific data patterns. For example, in the field of malware cleaners, antivirus software scans digital objects to test against a set of virus (and other malware) definitions. The term 'malware' as used herein encompasses computer viruses and other 'infections', along with spyware, adware and other software having a malicious effect on the computer. Digital objects that may become 'infected' or subjected to malicious software include, but are not limited to: files, directories, registry entries, Layered Service Providers (LSP's), file contents, services, running processes and modules, browser helper objects, and browser cookies. For purposes of convenience, the processes herein are discussed in the context of files, antivirus software, computer viruses and infections. However, other digital objects also may be scanned and tested for other types of malware or other types of data patterns.

Antivirus software typically scans multiple files for multiple viruses. A virus definition is created for each virus to be tested. A given file is tested against multiple virus definitions. To check all files for all virus definitions takes a long time. Conventionally, each file is read from the hard drive and input to a scan engine which does the testing against the virus definitions. Reading all the files takes a long time, and processing the files against all the virus definitions takes a long time. Processing speeds keep getting faster, while hard drive media transfer rates have been relatively stable. Accordingly, reading the files off of the hard drive is a bottleneck in the overall process.

Figure 4:
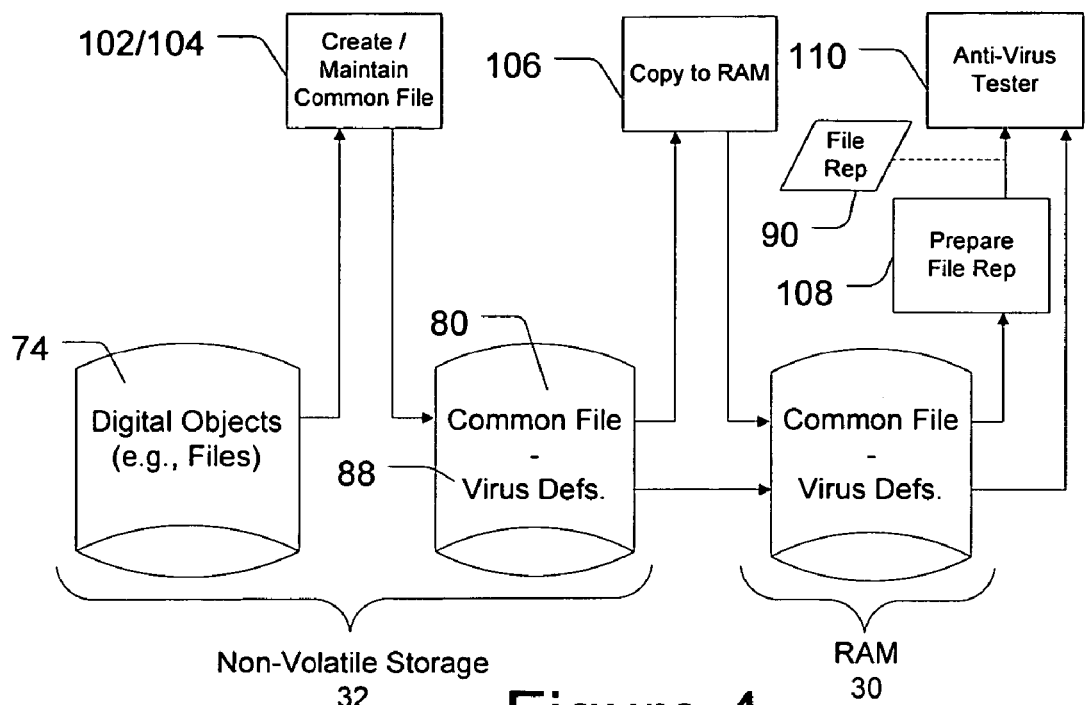
FIG. 4 is a functional data flow diagram for an accelerated data scanner according to one embodiment.
Figure 5:
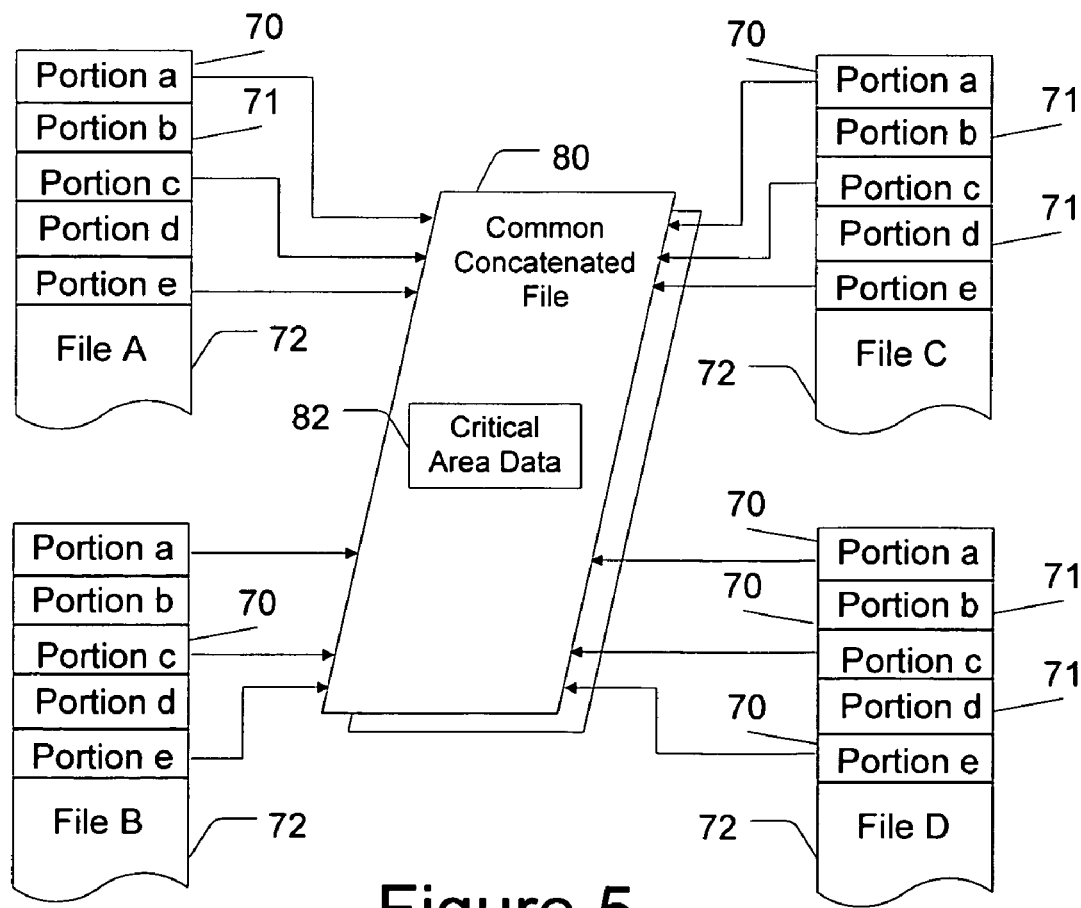
FIG. 5 is a diagram of a common file receiving data from files stored on a non-volatile storage medium.

Referring to FIGS. 4 and 5, in preferred embodiments portions 70 of files 72 (or other digital objects 74) are stored in a common concatenated file 80. The files and objects then are tested by accessing the common file 80, rather than the actual file 72. In a specific embodiment, the stored portions 70 correspond to critical areas 82 of the file 72. One or more critical areas 82 are stored in the common file 80. Accordingly, the common file 80 stores one or more portions 70 of a file 72, while the remaining portions 71 are not stored in the common file 80. The critical areas 82 may include the typical portions 70 of a file 72 which may become infected, (e.g., the first part of a file, the end of a file, the part where executable code starts). For some files 72, the file may be small enough that is more practical to store the entire file in the common file 80. However, not every file represented in the common file 80 has its entire contents 70, 71 included in the common file. Accordingly, in some embodiments the common file 80 may include less than all of the file contents 70, 71 for some files 72, and may include all of the file contents 70, 71 for other files 72. In other embodiments, the common file includes less than all file contents for each file 72 represented in the common file 80. Further, in some embodiments, the common file 80 includes critical areas 82 for every file 72 stored on the hard drive 32 (other than the common file). In other embodiments the common file 80 may include critical areas 82 for less than every file 72 stored on the hard drive 32.

Also, in some embodiments there are multiple common files 80. In one embodiment there is a common file for each file type and object type. In such embodiment, the critical areas for each jpeg file are stored in one common file, the critical areas for each executable file are stored in another common file, and the critical areas for each pdf file are stored in yet another common file. In some embodiments every file of a given type is stored in its corresponding common file. In other embodiments, not every file of a given file type has portions stored in a common file.

To perform antivirus scanning there are several alternative processes that may be performed. At some times, the conventional "brute force" scan can be performed in which each file on the hard drive is read and tested against every virus definition. This assures that 100% of the viruses capable of being detected using the virus definitions are indeed detected. (Of course, if the virus definitions are not complete or not effective, then not all viruses actually present on the computer are detected). As previously described, however, such a brute force scan takes an excessive length of time attributable at least in part to the time required to read all the files off of the hard drive.

At other times, an embodiment of this invention may be performed in which the data from the common file 80 is tested against the virus definitions 88, rather than the data 70 as directly read from the individual files 72 as stored in other parts of the hard drive 32. In various embodiments some or all portions of the common file 80 may be tested, (and some or all common files may be tested). For example, in some embodiments only the critical areas 82 corresponding to files 72 that have changed since last being tested are tested in a current scan. In still other embodiments less than all virus definitions 88 are included in the testing, such as only those definitions for viruses known to be active, or only those definitions for a prescribed number of the most common viruses, (e.g., the top 500 most common viruses).

An advantage of reading file critical areas 82 from the common file 80 instead of the actual file 72 is that the amount of data read from the hard drive 32 is reduced. In addition, the number of hard drive seeks is reduced. Note that due to file fragmentation, reading a file 72 from a hard disk 32 can require many seeks. Specifically, the drive head may need to move to various portions of the disk to read the file data. Each seek, for example, may add another 10 milliseconds to the file read time. When this added time is compounded for thousands of files, the delay is excessive. By storing the critical areas 82 together in a common file 80 less hard drive seeks may be used. Further, in some embodiments the common file 80 is stored together so as not to be fragmented. By storing the common file 80 in contiguous physical memory space, fewer hard drive seeks are required to read the file. Further, in some embodiments the common file is read sequentially, so as to reduce seeks when reading a common file. Accordingly, the time to access the data to be tested against virus definitions 88 is reduced.

There are various scan engines commercially available which receive a file name or directory name as an input. To integrate a solution for such engines, a substitute file may be submitted as an input to the scan engine for testing. In one embodiment, a representation 90 of the original file 72 is passed to the scan engine, rather than passing the actual file 72. To pass the actual file means that the actual file 72 is read from the hard drive 32 and fed to the scan engine. To pass the representation 90 means that the critical areas 82 for such file 72 are retrieved from the common file 80 rather than from the actual file 72, and fed to the scan engine. In some embodiments the representation 90 is smaller than the actual file 72 and includes the critical areas 82 (e.g., portions 70) as stored in the common file 80. In other embodiments the representation 90 is the same size as the actual file 72. For embodiments in which the representation 90 is the same size, fill data may be added to the representation 90. Specifically the file representation 90 may include the critical areas 82 in the portions where they appear in the original file, plus fill data in the other portions. The fill data may be all zeros, all ones, a prescribed pattern, a random pattern, or some combination of the same.

Common File Format

FIG. 6 shows an embodiment of a common file 80 and header information file 86. The common file 80 stores a block 82 of critical area data 82 for each one of a plurality of files 72. Each block 82 is formed by one or more chunks 84 of bits copied from the corresponding original file 72. The chunk of bits is referred to as a critical area data chunk 84, and preferably is an identical copy of a corresponding chunk of bits appearing in the original file. A file portion 70 of a file 72 may include one or more chunks 84. In some embodiments a critical area data chunk 84 instead is in a compressed format. Zero or more critical area chunks 84 are stored in the common file 80 for a given file 72. Preferably, one or more chunks 84 are stored for a given file 72. In some embodiments all files having an entry in the OS file system 62 directory have data stored in a common file 80. In other embodiments, less than every file 72 represented in the file system 62 directory has data stored in a common file 80. In some embodiments, archive files stored on the non-volatile storage medium 32 may include multiple entries in the header information file 86, (e.g., an entry for each file included in the archive file). In some embodiments multiple common files are included. For example, files having a different file type may be stored in different common files 80, with files of the same file type being stored in the same common file.

The header information file 86 may include information to correlate the critical area data blocks 82 to corresponding original files 72, along with information for accessing the critical area data chunks 84 and for preparing a representation of the original file 72. In one embodiment the header information file 86 may include file identification information 88, information 90 about the actual file 72, and critical area information 92. For a given file 72, the file identification information 88 may include: the operating system file name and file path; a file number; and/or a hash of the file path. For example the operating system 60 may define a unique file identification number for a file. Such number may be stored as the file number to identify the given file 72. Alternatively, a different file number may be created and stored as the file number for the given file 72. The file identification information 88 may be used to correlate a critical area data block 82 with a file 72. One of skill will appreciate that there are other types of file identification information that may be used to relate portions of the common file 80 to a specific file 72.

In one embodiment the information 90 about the actual file 72 may include a file checksum, a file type and a last modification date. The file type may be used to store files of a different type in the common file 80 in a different manner. The last modification date of a given file 72 may be used to determine whether or not to perform an antivirus test on the file 72. The checksum may be used by the antivirus application to be sure it has the correct file. Accordingly, in embodiments where a file representation is constructed from corresponding data chunks 84 in the common file 80 for input to the antivirus software, the constructed representation may be created to have the same checksum value as the corresponding file 72 stored in non-volatile storage 32. In other embodiments any of the checksum, file type or last modification date may be omitted, or may be used as accessed from a source other than the header file 86 (e.g., an operating system source). In an embodiment having multiple common files, with at least one common file for a given file type, the header information need not include the file type as such information is inherent by being in the specific common file. Further in some embodiments the last modification date is omitted or is retrieved from another source, such as the operating system file system 62.

In one embodiment a file 72 is grouped into a set of data chunks. The critical area information 92 may include: critical area data block 82 size for the file portions 70 stored in the common file 80; the number of chunks in the original file; the number of chunks from the original file 72 stored in the common file 80 as critical area data chunks 84; the offset within the common file 80 to a given chunk 84; and the offset within the original file 72 to a corresponding chunk. In an example embodiment, the chunk size may the same for each chunk of a given file 72, but may differ for differing files. For example, the chunk size may be determined based upon the file type. An executable file may have a different chunk size than a jpeg file. In one embodiment all jpeg files may be divided into a plurality of chunks of a common size, (although one chunk such as the last chunk of a given file may be smaller). Similarly all executable files may be divided into a plurality of chunks of a common chunk size different than the common jpeg chunk size. An advantage of implementing common chunk sizes is that the common file 80 is easier to maintain as original file 72 contents change with usage. In some embodiments there is a common file 80 for each one of multiple file types, (e.g., one or more common files for executable files; one or more common files for jpeg files; one or more common files for pdf files). In such an embodiment, files of a common file type are divided into multiple chunks of common size. Different common files 80 may have common-sized chunks 84 of a different size than the common-sized chunk of another common file.

In other embodiments, the critical area information 92 may vary. For example, the chunk size may be omitted in embodiments where the chunk size is fixed for a given file type. In such embodiment access to the file type provides the indication of the chunk size. The critical area information 92 may be used to access the critical area data chunks 84 within the common file 80 and to prepare a data chunk 84 to be fed to an antivirus test module.

One of skill will appreciate that other contents may be included or excluded from the file identification 88, actual file information 90, and critical area information 92, and that various file formats may be implemented. FIGS. 7 and 8, for example, show other embodiments in which the header information from header information file 86 is stored in the common file(s) 80. FIG. 7 shows common files 80' which may include a header area 94 and a critical data area 96. The header area 94 may include the data as described above for any of the various embodiments of the header information file 86. The critical data area 96 may include the critical area data blocks 82 and critical area data chunks 84 as described above for any of the various embodiments of the common file 80.

FIG. 8 shows common files 80" which may include header information 98 interspersed within the file 80" with the critical area data 82. For example, the header information 98 for a given critical data area 82 may be located adjacent to such critical data area 82 in logical address space (or physical address space). As another example, the header information 98 for a given critical data area block 84 may be located adjacent to such critical area data block 84 in logical address space (or physical address space).

In a best mode embodiment, a header file 86 includes a file identification and a pointer to a location in the common file where critical area data is located. In such embodiment the common file includes other header information and the critical area data chunks 84. One or more common files may be included. Further one or more header files may be included.

The pointer points to a location in a common file. In an embodiment in which chunks 84 are the same size for every chunk located in a given common file, the pointer may be an block 82 index. The pointer indicates the start of an area in the common file which includes the remaining header information and the critical area data chunks 84 for the corresponding file 72. In such embodiment as much header information as is feasible is located adjacent to the critical area data block 82. This allows the common file to be read sequentially for optimum access speed. Specifically, multiple files can be scanned for data patterns by sequentially reading the common file without the need for accessing the original file locations. This allows a single disk I/O to replace a very large number of random seeks and other file I/O operations. For example, if a file system 62 requires 32 kb for each file, then a single 1 MB sequential disk access to a common file will contain data for at least 32 files. Such single file may be read at close to the data transfer rate of the non-volatile storage medium 32 because no seeks are needed. (Note however, that circumstances may arise where a file 72 has been modified. In such circumstance the common file may be updated on the fly during a scan—or updated at another time.) It is appreciated that the common file 80 provides faster access to critical area data for multiple files 72 (relative to the time taken to access such areas in the original files 72 as located in the corresponding file 72 logical and physical address space). An advantage of the common file 80', 80" and the best mode embodiment is that even faster access may be provided by locating the header information closer to the critical area data, (e.g., fewer hard drive seeks; contiguous data locations allowing for streaming of data from the common file on the hard drive).

Accelerated Scanner Modules

Figures 9, 10:
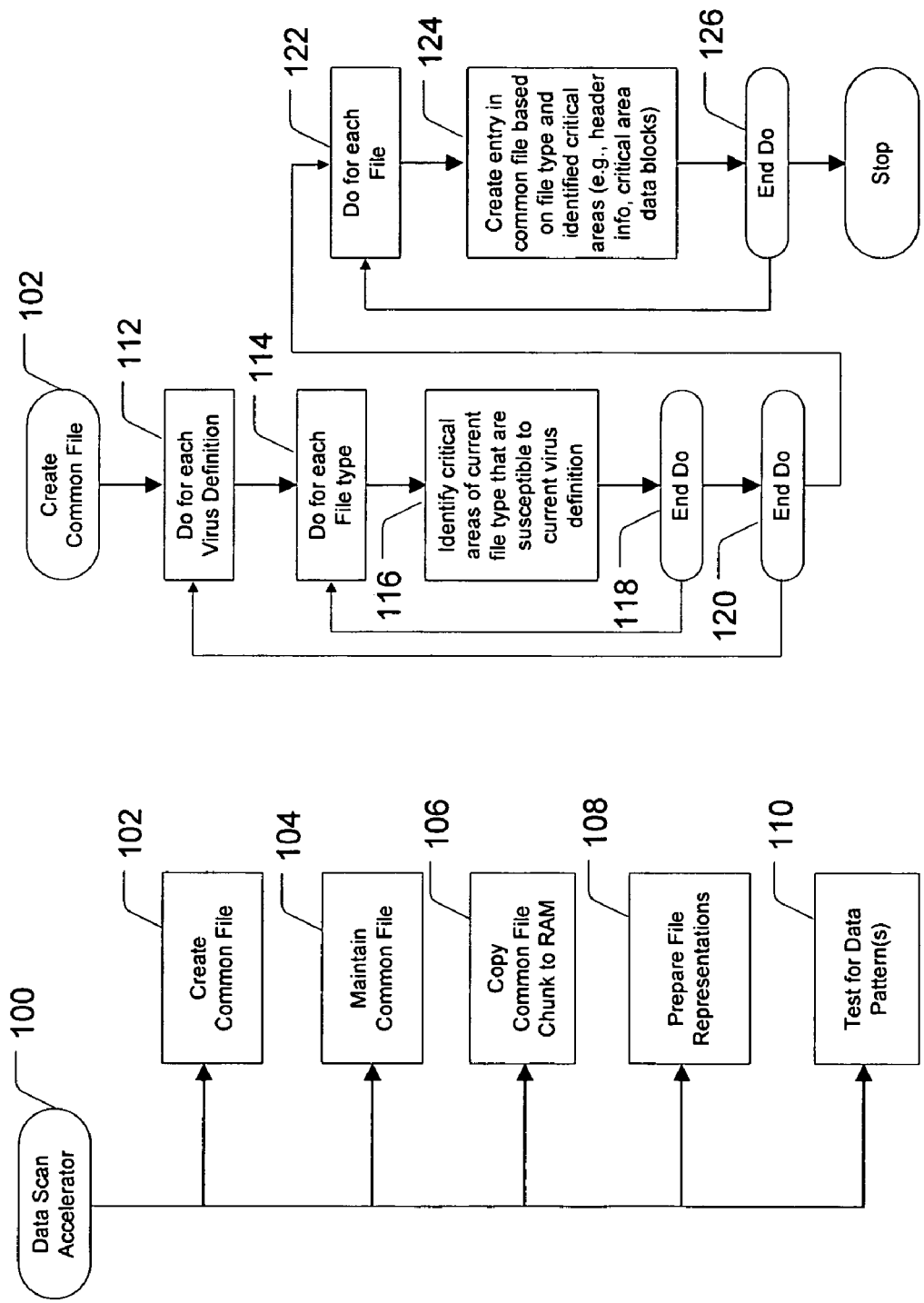
FIG. 9 is a diagram of the accelerated data scanner according to one embodiment.
FIG. 10 is a flow chart of a process to create a common file for an embodiment of the accelerated data scanner.

Referring to FIG. 9, an embodiment of the accelerated data scanner 100 executes several basic functions. One function is to create a common file 80, 80', 80" stored in non-volatile storage 32 for multiple files 72 in the file directory of file system 62. The files 72 may be stored on the non-volatile storage medium 32 and/or elsewhere. Such function may be performed by a module designated herein as a "create common file" module 102. Another function is to maintain the common file as the files 72 change (e.g., files 72 are added, deleted or modified). Such function may be performed by a module designated herein as a "maintain common file" module 104. Another function is to copy chunks of the common file into RAM 30. Such function may be performed by a module designated herein as a "copy common file chunks to RAM" module 106. In some embodiments the entire common file is streamed from the non-volatile storage 32 into RAM 30. In other embodiments less than the entire contents of the common file are loaded into RAM 30. Another function is to prepare data for pattern testing. Such function may be performed by a module designated herein as a "prepare file representations" module 108. In some embodiments the critical area data chunks 84 are fed to an antivirus processing module. In other embodiments a file is constructed for input to the antivirus processing module. For example, the critical area data chunks 84 are located within the constructed file at the relative intra-file location as in the original corresponding file 72. The constructed file may have the same file size as the corresponding file 72. In such embodiment the non-critical data is filled with random data or a fill pattern. Another function is to perform a search of the critical areas chunks for a specified data pattern. Such function may be performed by a module designated herein as a "test for data pattern(s)" module 110. In the preferred embodiment the data patterns correspond to virus and other malware definitions. In alternative embodiments, the data patterns may serve another purpose (e.g., a general purpose search).

Create Common File—Module 102

Referring to FIG. 10, the portions of a file 72 which may be susceptible to a virus or other malware may be identified and stored in the common file (or in a specific common file among a plurality of common files). In some embodiments, the susceptible portions may be determined based upon file type and by the infection type. In one embodiment, at steps 112, 120 a do loop is established to perform processing for each virus definition (or virus type). At steps 114, 118 a do loop is established to perform processing for each file type. At step 116, the critical areas for the current file type that are susceptible to the current virus definition (or virus type) are identified.

At steps 122, 126 a do loop is established to perform processing for each one of multiple files 72. The domain of files 72 to be processed may vary for differing embodiments. In some embodiments every file 72 listed in the file table 62 is processed. In other embodiments less than every file 72 is processed, (e.g., files of a type not susceptible to a virus or files based upon other criteria may be omitted). At step 124 one or more entries are created in the common file 80, 80', 80". Specifically, the critical area data chunks 84 are stored in the common file. In addition, header information as described above may be stored in the common file 80', 80" or in another file 86. In a preferred embodiment the common file 80, 80', 80" is stored in non-volatile storage.

Maintain Common File—Module 104

Referring to FIG. 11, several functions may be performed to maintain the common file. Conditions which may result in updating the common file may include: testing for a new virus definition condition 130; new file 72 condition 132; deleted file 72 condition 134; modified file 72 condition 136. In some embodiments, occurrence of the condition may trigger processing to maintain the common file. In other embodiments, condition processing may be performed at periodic intervals.

Referring to FIG. 12, for a new virus definition condition 130 processing may be performed based on file type and virus definition as described above for creating the common file. Specifically, at steps 142, 146 a do loop is established to perform processing for each file type. At step 144, the critical areas for the current file type that are susceptible to the current virus definition (or virus type) are identified.

At steps 148, 152 a do loop is established to perform processing for each one of multiple files 72. At step 150, one or more entries are created in the common file 80, 80', 80". Specifically, the critical area data chunks 84 are stored in the common file. In addition, header information as described above may be stored in the common file 80', 80" or in another file 86.

Referring to FIG. 13, for a new file condition a background process may check the file system 62 to maintain a list of files 72 that do not have an entry in any of the common files 80. As files are discovered, an entry may be created at step 156 in the common file 80, 80', 80". For example, the critical area data chunks 84 and header information as described above may be stored in the common file 80', 80", or in the common file 80 and another file 86.

Referring to FIG. 14, a file 72 having one or more entries in the common file may be found to have been deleted. At step 158, the entries in the common file are deleted. For example, the critical data area chunks 84 may be deleted or merely invalidated. In addition, the corresponding header information may be deleted or updated to indicate that the common file critical area data chunk entries are invalid and may be overwritten.

Referring to FIG. 15, a file 72 having one or more entries in the common file may be found to have been modified. At step 160, the corresponding header information is updated, and the critical area data chunks 84 may be overwritten or rewritten to the common file. For example, the checksum and last modification date may have changed and be overwritten or rewritten. In addition the block checksums, chunk checksums, number of blocks, block offsets and critical area data chunks 84 may have changed and be overwritten or rewritten.
Copy Common File Chunks to RAM—Module 106

Referring to FIG. 16, preferably all or a portion of the common file 80, 80', 80" (and other file 86) are copied into RAM at step 162. In some embodiments a RAMDISK is created and a copy of the common file resides on the RAMDISK. In other embodiments chunks 84 of the common file are copied into RAM to enable an antivirus test module to access the data. Additional chunks 84 may be loaded into RAM as the antivirus testing progresses, (e.g., as additional files are needed to be tested or in anticipation of such testing).
Prepare File Representations—Module 108

FIG. 17 shows a flow chart of a module 108 for preparing data to be tested. In some embodiments, the module 108 is executed in response to activation of an antivirus testing application. Module 108 may feed data to the antivirus testing application. At steps 164, 174 a do loop is set up to process a plurality of files representations 90 (see FIG. 4). The plurality of files may be every file 72 that has an entry in the common file. In other embodiments, a subset of the files having entries may be processed. A file representation 90 corresponds to a file 72 and may include one or more of the critical area data chunks 84 for such file 72. In a specific embodiment a constructed file representation 90 may include all the critical area data chunks 84 for such file 72, along with fill data. In another embodiment, a file representation 90 includes only the critical area data chunks 84. In such other embodiment one or more file representations 90 for a given file 72 may be fed to the antivirus application to test various critical area data chunks 84 of such file 72.

Within the do loop further criteria may be implemented. At step 166 such other criteria is tested. In one embodiment, additional criteria may include whether the file 72 has been modified since it was lasted tested and found to be free of infections. For example, in some embodiments, a file 72 that has not changed since it was lasted tested against a set of virus definitions and found to be free of infection is not retested with every run of the antivirus application. Such file may be retested periodically even if it has not changed. Such file may be retested when additional virus definitions are added to the test antivirus application. In some embodiments a file that has not been modified for a time exceeding a threshold time (e.g., 6 months) may be omitted from testing even in the presence of a new virus definition under the assumption that the new virus has not been in existence for a time exceeding the threshold time.

There are various methods for determining when a file has been modified. For example, a monitor process may run to track changes to files. Anytime a file is opened (or in some embodiments anytime a file is written) the monitor process may set a flag indicating that the file has been modified, or may enter the file id into a list of files that has been modified. Alternatively the last modification date set by the operating system 60 can be read and compared to a last modification date stored in the header information 90 for a given file 72 at step 166. In some cases the checksum value for a file may be compared with the corresponding checksum stored in the header information 90 for such file at step 166.

For a file 72 that is to be tested, at step 168, the critical data area chunks 84 for such file 72 may be read from the common file 80, 80', 80" in RAM. In particular the critical area data is read from the common file rather than from the actual file to improve the data access speed. Such approach has the advantage of decreasing the time needed to read the critical area data for a set of files 72.

At step 170, a file representation 90 is constructed. In a preferred embodiment the constructed file representation 90 is the same bit length as the corresponding original file 72. The file representation 90 may include the critical area data chunks 84 for such file 72 as copied from the common file 80, 80', 80", along with fill data.

At step 172 the file representation 90 is fed to the antivirus testing application (e.g., test module 110). In some embodiments, such feeding may be through a process call. In other embodiments, such feeding may be through an intercept that intercepts the antivirus application call to read a file and instead feeds in the file representation. In another embodiment, such feeding may be to feed in data chunks for testing rather than a file.

Accordingly, various interfaces with an antivirus test engine may be created. A file may be fed or a data chunk may be fed according to the interface with the antivirus test engine. As used herein, the tem file representation is intended to encompass sending a file (e.g., a constructed file representation) or a portion of a file to the antivirus test engine.
Test for Data Pattern(s)—Module 110

FIG. 18 shows a flow chart for a test module 110. The test module may be a conventional antivirus test application, a conventional antivirus test engine (e.g., a portion of a conventional antivirus test application program), another antivirus test process or another data pattern testing process. As previously described, the term antivirus is used for convenience. Other types of malware also may be detected. Further, data patterns may be tested for a purpose other than to identify viruses and malware.

At step 182 the file representation 90 is received. At steps 184, 192 a do loop may be established to process the file representation for a given virus definition (or other data pattern). At step 186, a determination is made as to whether the data pattern is present in the file representation 90. If the data pattern is present, a response action is taken at step 188 and a result is logged at step 190. For an antivirus test module, the action taken at step 188 may include deleting the file 72, quarantining such file, or modifying such file (e.g., such as to delete the data pattern). The purpose of taking action is to stop or prevent harm to the computer (e.g., remove the computer "infection") that likely is being caused by the virus associated with the detected data pattern. A log of the results for each file may be maintained in a log. A log entry may for example, indicate that no infections were found for a tested file 72. A log entry may indicate that an infection was found and that action was taken, (e.g., the log may provide a name for the infection; the log may indicate what action was taken; the log may indicate whether the action taken was successful).

The accelerated data scanner modules may be executed at various times in various orders to achieve an effective antivirus scanner. For example, upon installation a brute force scan may occur in which one or more common files 80, 80', 80" and header files 86 are created. Specifically, the header information is created and the critical area data chunks 84 are stored. At other times, the accelerated data scanner may process every file having a critical area data block 82 stored in a given common file or in any common file. At other times, the accelerated scanner may implement criteria to perform testing on a subset of files, such as those that have not been modified since last found to be free of infection or to perform testing for a reduced set of virus definitions (e.g., the most prevalent viruses known to be in circulation).

In some embodiments, a background "scrubbing" process is included which checks the validity of the common file and header information. For example, a low priority background process may compare the critical area data chunks 84 with the corresponding areas in the original file 72 to be sure that the chunk 84 contents are accurate.

It is to be understood that the foregoing illustrative embodiments have been provided merely for the purpose of explanation and are in no way to be construed as limiting of the invention. Words used herein are words of description and illustration, rather than words of limitation. In addition, the advantages and objectives described herein may not be realized by each and every embodiment practicing the present invention. Further, although the invention has been described herein with reference to particular structure, materials and/or embodiments, the invention is not intended to be limited to the particulars disclosed herein. It should be noted that some steps may be deleted, added or re-ordered. The invention is intended to extend to all functionally equivalent structures, methods and uses, such as are within the scope of the appended claims. Those skilled in the art, having the benefit of the teachings of this specification, may affect numerous modifications thereto and changes may be made in form and details without departing from the scope and spirit of the invention.

What is claimed is:

1. A method of testing digital objects stored on a non-volatile storage medium for a predefined data pattern corresponding to a virus definition, comprising:
   for each one of a plurality of digital objects, storing a predetermined select portion of said each one digital object into a common data structure;
   reading the predetermined select portion of a given object from the common data structure, said given object being among said plurality of digital objects,
   testing the predetermined select portion as read from the common data structure, wherein said testing comprises testing a representation of said given object, wherein said representation comprises said predetermined select portion of the given object as read from said common data structure, wherein said testing determines whether content of said predetermined select portion of said given object corresponds to the predefined pattern, and wherein said predefined pattern corresponds to a virus definition; and
   passing the representation to an antivirus module which executes said testing, said antivirus module being passed and testing said representation instead of a corresponding actual object from which the predetermined select portion is derived.

2. The method of claim 1, further comprising:
   constructing a representation of said given object, wherein said constructing occurs after said storing, said representation is constructed without accessing said given object, and said representation is constructed at least in part from said predetermined select portion read from the common data structure.

3. The method of claim 2, wherein said plurality of digital objects is a first plurality of digital objects and wherein said constructing and testing are performed for a second plurality of objects among said first plurality of digital objects.

4. The method of claim 2, wherein said constructing comprises copying said representation to RAM.

5. The method of claim 1, wherein said representation is the same size as the given object on the non-volatile storage medium from which the predetermined select portion is derived, and wherein said representation comprises said predetermined select portion and non-actual data.

6. The method of claim 5, wherein said testing said representation is tested for said predefined pattern instead of testing a corresponding actual object from which the predetermined select portion is derived.

7. The method of claim 1, further comprising:
   storing a checksum and last modification date for each one object of said plurality of digital objects;
   determining, based upon either one or both of said checksum and last modification date, whether said each one object has been modified since last tested; and
   performing said testing for each object determined to have been modified.

8. The method of claim 7, wherein said testing is omitted for each object determined not to have been modified.

9. The method of claim 7, wherein said storing comprises:
   storing said checksum and modification date in said common data structure.

10. The method of claim 1, in which said testing comprises testing the representation to determine whether content of said predetermined select portion corresponds to any one or more predefined patterns; and further comprising selecting said one or more predefined data patterns from among a set of patterns comprising computer virus definitions.

11. The method of claim 1, wherein said predetermined select portion comprises a copy of a data chunk of the given object, said data chunk including a potential site of infection by a computer virus.

12. A computing system for scanning objects for data patterns; comprising:
   a plurality of digital objects residing in non-volatile storage;
   a common data structure residing in non-volatile storage which stores copies of predetermined select portions of said plurality of digital objects;
   means for copying the common data structure into volatile storage;
   a plurality of data pattern definitions;
   means for testing a digital object for presence of the plurality of data pattern definitions;
   means for providing said testing means with a substitute for the digital object, said testing means testing the digital object by testing the substitute instead of the digital object, wherein the substitute comprises a predetermined select portion of said digital object as read from the common data structure.

13. The system of claim 12, wherein the plurality of data patterns comprise a plurality of computer virus definitions; and wherein the predetermined select portions comprise likely sites of infection for computer viruses corresponding to said set of virus definitions.

14. The system of claim 12, wherein the common data structure comprises a plurality of blocks of data, wherein each said block corresponds to one of said plurality of digital objects.

15. The system of claim 12, wherein the common data structure comprises a plurality of chunks of data, wherein one or more chunks of said plurality of chunks corresponds to one of said plurality of digital objects.

16. The system of claim 12, wherein the common data structure further comprises object data for each one of said plurality of digital objects having a predetermined select portion stored in the common data structure, said object data comprising an object identifier, and an object type, said object identifier for correlating a predetermined select portion with a corresponding digital object.

17. The system of claim 12, wherein the common data structure further comprises data for designating where within a corresponding digital object a predetermined select portion is located.

18. The system of claim 12, wherein the common data structure further comprises data for designating where within the common data structure a predetermined select portion for a corresponding digital object is located.

19. The system of claim 12, wherein the digital object comprises a plurality of chunks of data, said predetermined select portion of a given digital object comprising one or more of said plurality of chunks, and wherein the common data structure stores a plurality of chunks of data, wherein each said stored chunk is part of a predetermined select portion of one of said plurality of digital objects, the common data structure further comprising data for designating a number of chunks stored in the common area for a given digital object, a location within the common file for said stored chunks, and a corresponding location within the digital object for said stored chunks.

20. The system of claim 12, further comprising: means for preparing said substitute of the digital object, said substitute comprising the predetermined select portions of said digital object and fill data.

21. A computer program embodied on a computer-readable non-transitory storage medium for providing a data pattern searching subsystem on a computer having a plurality of digital objects stored in non-volatile storage, comprising:
a code segment that at least maintains a common data structure comprised of predetermined select portions of the plurality of digital objects;
a data pattern definition code segment that at least maintains a set of data pattern definitions;
a data pattern detecting code segment which for a current scan of the plurality of digital objects determines whether corresponding predetermined select portions of the plurality of digital objects exhibit a data pattern corresponding to a definition among the set of data pattern definitions;
an object representation code segment which for a given digital object to be scanned by said data pattern detecting code segment, provides a representation of the given digital object, said representation comprising a corresponding predetermined select portion read from the common data structure, said data pattern detecting code segment testing said representation instead of testing the corresponding digital object.

22. The subsystem of claim 21, wherein said representation further comprises fill data, wherein said representation has a size corresponding to size of the corresponding digital object, and wherein said predetermined select portions of the given digital object are located within the representation in a same relative location at which the predetermined select portions are found in the corresponding digital object.

23. The subsystem of claim 21, wherein the set of data patterns comprise a set of virus definitions and wherein said predetermined select portions comprise portions that are potential sites of infection.

24. The subsystem of claim 21, wherein the code segment for maintaining the common data structure comprises a code segment for maintaining the common data structure in non-volatile storage, and further comprising a code segment for copying a portion of the common data structure into volatile storage, and wherein said object representation code segment reads the predetermined select portion from the common data structure in volatile storage to prepare the representation.

25. The subsystem of claim 21, wherein the common data structure consists of a file.

26. The subsystem of claim 21, wherein the plurality of digital objects is a first plurality of digital objects of a first object type, and wherein the code segment is a first code segment that maintains a first common file comprised of predetermined select portions of the first plurality of digital objects; and further comprising a second code segment that maintains a second common file comprised of predetermined select portions of a second plurality of digital objects of a second object type.

27. A method of testing digital objects stored on a non-volatile storage medium for a predefined data pattern, comprising:
for each one of a plurality of digital objects, storing a predetermined select portion of said each one digital object into a common file;
reading the predetermined select portion of a given object from the common file, said given object being among said plurality of digital objects,
testing the predetermined select portion as read from the common file;
wherein said testing determines whether content of said predetermined select portion of said given object corresponds to the predefined pattern.

28. The method of claim 27, wherein said testing comprises:
testing a representation of said given object, wherein said representation comprises said predetermined select portion of the given object as read from said common file.

29. The method of claim 28, wherein said predefined pattern corresponds to a virus definition, and further comprising passing the representation to an antivirus module which executes said testing, said antivirus module being passed and testing said representation instead of a corresponding actual object from which the predetermined select portion is derived.

30. The method of claim 27, further comprising:
constructing a representation of said given object, wherein said constructing occurs after said storing, said representation is constructed without accessing said given object, and said representation is constructed at least in part from said predetermined select portion read from the common file.

31. The method of claim 30, wherein said plurality of digital objects is a first plurality of digital objects and wherein said constructing and testing are performed for a second plurality of objects among said first plurality of digital objects.

32. A method of testing digital objects stored on a non-volatile storage medium for a predefined data pattern, comprising:
for each one of a plurality of digital objects, storing a predetermined select portion of said each one digital object into a common file, wherein the plurality of digital objects is a first plurality of digital objects of a first object type, and said storing comprises storing the predetermined select portion of said each one digital object into a first common file;
for each one of a second plurality of digital objects of a second object type, storing a predetermined select portion of said each one digital object of the second plurality of digital objects into a second common file;
reading the predetermined select portion of a given object from the common file, said given object being among said plurality of digital objects, wherein said reading comprises the predetermined select portion of a given object from a corresponding one common file of the first and second common file;

testing the predetermined select portion as read from the common file, wherein said testing determines whether content of said predetermined select portion of said given object corresponds to the predefined pattern, and wherein said testing comprises testing the predetermined select portion as read from said corresponding one common file to determine whether content of said predetermined select portion of said given object corresponds to the predefined pattern.

\* \* \* \* \*